(12) United States Patent
Zhou

(10) Patent No.: US 12,259,235 B2
(45) Date of Patent: Mar. 25, 2025

(54) TAPE MEASURE WITH SAFETY BRAKING

(71) Applicant: NINGBO HONGDI MEASURING TAPE INDUSTRY CO., LTD, Yuyao (CN)

(72) Inventor: Xiaogang Zhou, Zhejiang (CN)

(73) Assignee: NINGBO HONGDI MEASURING TAPE INDUSTRY CO., LTD, Zhejiang (CN)

( * ) Notice: Subject to any disclaimer, the term of this patent is extended or adjusted under 35 U.S.C. 154(b) by 313 days.

(21) Appl. No.: 17/999,726

(22) PCT Filed: May 26, 2021

(86) PCT No.: PCT/CN2021/096174
§ 371 (c)(1),
(2) Date: Nov. 23, 2022

(87) PCT Pub. No.: WO2021/239011
PCT Pub. Date: Dec. 2, 2021

(65) Prior Publication Data
US 2023/0236001 A1    Jul. 27, 2023

(30) Foreign Application Priority Data

May 26, 2020  (CN) .......................... 202010456818.X

(51) Int. Cl.
*G01B 3/1007*    (2020.01)
(52) U.S. Cl.
CPC .... *G01B 3/1007* (2020.01); *G01B 2003/1012* (2013.01)

(58) Field of Classification Search
CPC .......... G01B 3/1007; G01B 2003/1012; G01B 3/1043; G01B 2003/1023; G01B 2003/1033
See application file for complete search history.

(56) References Cited

U.S. PATENT DOCUMENTS 5,245,761 A * 9/1993 Waldherr ............. G01B 3/1005
                                                      242/381.3
5,400,521 A * 3/1995 Waldherr ............. G01B 3/1005
                                                      242/385.4
(Continued)

FOREIGN PATENT DOCUMENTS

CN           101082476           12/2007
CN           101082476 A    *    12/2007
(Continued)

*Primary Examiner* — Yaritza Guadalupe-McCall
(74) *Attorney, Agent, or Firm* — McDonnell Boehnen Hulbert & Berghoff LLP

(57) ABSTRACT

Disclosed is a tape measure, comprising: a tape measure housing (1) provided with an accommodating cavity; a tape core assembly (2) arranged in the accommodating cavity; and a tape belt assembly (3) wound around the tape core assembly (2). The tape measure housing (1) is further provided with a tape outlet for the tape belt assembly (3) to extend outwards. The tape measure further comprises a braking assembly (4) and a driving assembly (5), wherein the driving assembly (5) is movably mounted onto the tape measure housing (1); the tape core assembly (2) is provided with a braking face (201); the driving assembly (5) drives the braking assembly (4) to come into contact with the braking face (201) of the tape core assembly (2) and to press the same, thereby realizing braking. Abrasion of the scale on the surface of a tape belt is effectively prevented.

14 Claims, 8 Drawing Sheets

(56) References Cited

U.S. PATENT DOCUMENTS

| | | | | |
|---|---|---|---|---|
| 7,065,896 B1* | 6/2006 | Lin | ............ | G01B 3/1005 33/767 |
| 2004/0035017 A1 | 2/2004 | Yang | | |
| 2008/0034604 A1* | 2/2008 | Critelli | ............ | G01B 3/1005 33/767 |
| 2023/0236001 A1* | 7/2023 | Zhou | ............ | G01B 3/1007 33/767 |

FOREIGN PATENT DOCUMENTS

| | | | | | |
|---|---|---|---|---|---|
| CN | 203396291 | | 1/2014 | | |
| CN | 203396291 | U * | 1/2014 | | |
| CN | 203572349 | | 4/2014 | | |
| CN | 203572349 | U * | 4/2014 | | |
| CN | 111486761 | | 8/2020 | | |
| CN | 111486761 | A * | 8/2020 | ...... | G01B 3/1005 |
| CN | 212227902 | | 12/2020 | | |
| JP | 2020051825 | | 4/2020 | | |
| JP | 2020051825 | A * | 4/2020 | | |
| WO | 2008/021759 | | 2/2008 | | |

\* cited by examiner

TAPE MEASURE WITH SAFETY BRAKING

TECHNICAL FIELD

The present invention relates to a tape measure, and in particular to a more durable tape measure with a good braking effect.

CROSS REFERENCE TO RELATED APPLICATIONS

This application is a U.S. National Phase of International Application No. PCT/CN2021/096174, filed on May 26, 2021, which claims priority to Chinese Patent Application No. 202010456818.X, filed May 26, 2020 all of which are incorporated by reference herein in their entirety.

BACKGROUND ART

Tape measures are a measuring tool commonly used by people. A braking system of an existing tape measure usually uses a braking pad to contact a tape belt, and the friction force between the braking pad and the tape belt stops the tape measure, thereby achieving the braking of the tape measure. Due to the long-term contact and friction between the tape belt and the braking pad, it is easy to cause the scale on the surface of the tape belt to become unclear because of the friction of the braking pad, which affects the normal use of the tape measure; or the braking pad itself wears down, so that the braking ability of the tape measure is reduced. Due to the above defects, the service life of the tape measure is reduced.

The braking system of the existing tape measure needs to have a relatively large movable space, and the volume of the tape measure also needs to have a relatively large accommodating space accordingly, resulting in an increase in the volume of the tape measure.

SUMMARY OF THE INVENTION

In order to overcome the deficiencies in the prior art, the present invention provides a tape measure, wherein a braking assembly of the tape measure is in contact with a tape core assembly to realize the braking effect of the tape measure, which effectively avoids the wear of the scale on the surface of a tape belt, and increases the service life of the tape measure. Moreover, the braking system of the tape measure of the present invention requires a small movable space, and accordingly, the tape measure of the present invention can be made with a smaller volume.

In order to achieve the above objective, the present invention is implemented by adopting the following technical solution:

a tape measure, comprising a tape measure housing provided with an accommodating cavity, a tape core assembly arranged in the accommodating cavity, and a tape belt assembly wound around the tape core assembly, wherein the tape measure housing is further provided with a tape outlet for the tape belt assembly to extend outwards; and comprising a braking assembly and a driving assembly, wherein the driving assembly is movably mounted on the tape measure housing, the tape core assembly is provided with a braking face, and in a state in which the driving assembly moves to a braking position, the driving assembly drives the braking assembly to come into contact with the braking face of the tape core assembly and to press the same, thereby realizing braking.

In the tape measure, the assembly may include a single part or a plurality of parts.

The braking assembly is operated so that when the braking assembly is located at the braking position, the braking assembly comes into contact with the braking face of the tape core assembly and presses the same, and the tape core assembly is restricted to stop rotating; otherwise, the braking assembly is far away from the braking position, the braking assembly and the braking face of the tape core assembly are not pressed against each other, and the tape core assembly can be freely rotated.

Further, the tape measure comprises an elastic member acting on the driving assembly, wherein an action force of the elastic member causes the driving assembly to have a tendency to move to the braking position.

One end of the elastic member is connected and fixed to the driving assembly, and the other end is connected and fixed to the tape measure housing. Specifically, the driving assembly is provided with a first elastic member fixing member, the first elastic member fixing member is a fixing hook, and a connecting end of the elastic member and the driving assembly is provided with a first fixing ring that is matched with the first elastic member fixing member and sleeved on the first elastic member fixing member. The tape measure housing is provided with a second elastic member fixing member, the second elastic member fixing member is a fixing column, and a connecting end of the elastic member and the tape measure housing is provided with a second fixing ring that is matched with the second elastic member fixing member and sleeved on the second elastic member fixing member.

When the driving assembly is far away from the braking position, the elastic member is in a stretched state or a compressed state. When the elastic member is in the stretched state, the elastic member wants to return to its original state, so the elastic force generated by the elastic member pulls the driving assembly to move to the braking position. When the elastic member is in the compressed state, the elastic member wants to return to its original state, so the elastic force generated by the elastic member pushes the driving assembly to move to the braking position.

The elastic member adopts a spring.

Further, the tape measure may be configured so that: the driving assembly is slidably mounted on the tape measure housing, and along a direction from the braking position to away from the braking position, a distance between an inner wall of the tape measure housing where the drive assembly is arranged and the braking face of the tape core assembly is set to change from small to large.

Further, the braking assembly is connected to the driving assembly.

With the above structure, the braking assembly moves synchronously with the driving assembly. When the driving assembly is located at the braking position, the braking assembly comes into contact with the braking face of the tape core assembly and presses the same, and the tape core assembly is restricted to stop rotating. When the braking assembly is far from the braking position, since the distance between the tape measure housing and the tape core assembly changes from small to large, the braking assembly as a whole moves from a small distance to a large distance, and the braking assembly is separated from the braking face of the tape core assembly to realize the free rotation of the tape core assembly.

Further, the braking assembly is a wedge-shaped member; the driving assembly passes out of the tape measure housing to form an operating member, and the braking assembly is connected to the operating member through a connecting member. More specifically, the driving assembly is integrally molded with the braking assembly.

The operating member is used by an operator to operate the driving assembly.

Further, the tape measure may be configured so that: the driving assembly comprises a first driving member acting on the braking assembly, the first driving member is arranged on one side of the braking assembly, and in a state in which the driving assembly moves to the braking position, the first driving member drives the braking assembly to come into contact with the outer circumferential braking face of the tape core assembly and to press the same.

When the driving assembly moves to the braking position, the first driving member drives the braking assembly to come into contact with the braking face of the tape core assembly, the first driving member presses down the braking assembly and transmits force to the braking assembly, so that the braking assembly and the braking face of the tape core assembly are pressed against each other, and the tape core assembly is restricted to stop rotating. When the driving assembly is far away from the braking position, the first driving member does not press down the braking assembly, and the braking assembly and the tape core assembly are not pressed against each other to realize the free rotation of the tape core assembly.

Further, the driving assembly comprises a second driving member acting on the braking assembly, wherein the second driving member is arranged on a side opposite to the first driving member.

Since the second driving member is arranged on the side opposite to the first driving member, namely, the other side of the braking assembly, when the driving assembly is far away from the braking position, the second driving member drives the braking assembly away from the braking face of the tape core assembly, so that the braking assembly is separated from the braking face of the tape core assembly. When the tape core assembly rotates freely, the contact between the tape core assembly and the braking assembly is reduced, which reduces the loss and prolongs the service life.

Specifically, the driving assembly protrudes toward the braking face side of the tape core assembly to form the first driving member and the second driving member, and a movable space for accommodating the braking assembly is formed between the first driving member and the second driving member.

Further, the first driving member and the second driving member are rotatably arranged in the tape measure housing, one end of the first driving member acts on one side of the braking assembly, and one end of the second driving member acts on the other side of the braking assembly. A braking force is applied to the first driving member, and the braking force acts on the first driving member to press down the braking assembly, so that the braking assembly always has a tendency to come into contact with the braking face of the tape core assembly and press the same. When the tape measure is in a reverse braking state, a reverse braking force is applied to the second driving member. The reverse braking force acts on the second driving member to make it lift the braking assembly, so that the braking assembly is separated from the braking face of the tape core assembly.

Specifically, the first driving member and the second driving member adopt a plate-like structure, and the braking force acts between a rotation point of the first driving member and a contact end with the braking assembly. The reverse braking force acts on an end of the second driving member away from the braking assembly, and a rotation point of the second driving member is between the reverse braking force and the braking assembly.

More specifically, one end of the elastic member is fixed between the rotation point of the first driving member and the contact end with the braking assembly for providing braking force. The driving assembly comprises an operating member, the operating member is rotatably arranged on the tape measure housing, one end of the operating member is provided with a reverse braking lever, and the reverse braking lever acts on the side of the second driving member away from the braking assembly to provide a reverse braking force.

The elastic member acts on the first driving member. Since the acting point is located between the rotation point and the contact end with the braking assembly, the contact end of the first driving member with the braking assembly rotates toward the side close to the braking assembly to press down the braking assembly, so that the braking assembly always has a tendency to press the braking face.

The operating member is pressed, the operating member rotates to the side where the reverse braking lever is arranged, and the reverse braking lever presses the end of the second driving member away from the braking assembly. Since the reverse braking lever and the braking assembly are located on both sides of the rotation point of the second driving member, the side acting on the braking assembly lifts the braking assembly, so that the braking assembly is separated from the braking face of the tape core assembly.

The operating member is released, the braking force drives the first driving member to press down the braking assembly, and the braking assembly acts on the second driving member while pressing the braking face of the tape core assembly, so that the second driving member is reset.

Further, the tape measure comprises a guide groove matched with the braking assembly. A side end of the braking assembly is slidably clamped in the guide groove.

Specifically, both side ends of the braking assembly are clamped in the guide groove.

The guide groove is used for guiding the braking assembly to be close to or away from the braking face of the tape core assembly.

The guide groove is arranged to provide a moving trajectory for the braking assembly, so that the braking assembly can be more smooth and stable when moving.

Since both ends of the braking assembly are clamped in the guide groove, if an installation portion of the braking assembly being clamped into the guide groove is in a rotatable shape, during braking, when the braking assembly comes into contact with the braking face of the tape core assembly, the tape core assembly will drive the braking assembly to rotate, and the braking assembly and the braking face of the tape core assembly are pressed against each other in a rolling manner. The use of rolling friction pressing effectively reduces the friction loss between the two and increases the service life of the product.

Further, one end of the guide groove intersects with the braking face or its extension surface, and the other end extends away from the braking face toward the tape measure housing side; and along a direction of the guide groove away from the braking face, the guide groove is inclined toward the driving assembly side.

Since one end of the guide groove intersects the braking face or its extension surface, when the braking assembly moves to an intersecting end of the guide groove, it comes into contact with the braking face and presses the same. The other end of the guide groove extends toward the tape measure housing side away from the braking face, and the braking assembly is separated from the braking face when it is in a distal section.

Since the guide groove is inclined to the braking assembly side, a V-shaped included angle is formed between the guide groove and the braking face of the tape core assembly. A connecting line between two ends of the guide groove is referred to as a groove axis. An included angle between the tangent of the intersection of the groove axis and the tape core assembly and the groove axis is a V-shaped included angle. When the driving assembly is in the braking position, the braking assembly moves toward the bottom of the guide groove to come into contact with the braking face of the tape core assembly and press the same. Due to the existence of the V-shaped included angle, the more the braking assembly and the tape core assembly are pressed against each other, the greater the pressing force between the two is, so that the rotation of the tape core assembly can be stopped quickly. When the driving assembly is far away from the braking position, the braking assembly moves toward the head of the guide groove, so that the braking assembly is separated from the tape core assembly, and the tape core assembly rotates freely.

Further, the guide groove is provided on an inner side wall of the tape measure housing.

Further, the driving assembly is provided with a guide member, and the guide member is provided with the guide groove.

Further, the braking assembly is a circular shaft or a special-shaped shaft.

By adopting the circular shaft, the friction between it and the tape core assembly can be realized as rolling friction, which effectively reduces the friction loss between the two and increases the service life of the product.

When the special-shaped shaft is adopted, the braking assembly adopts a wedge-shaped shaft design. When the wedge-shaped shaft is adopted, only one end of the guide groove needs to intersect the braking face or its extension surface, and the other end extends toward the tape measure housing side away from the braking face.

Further, the braking assembly is provided with a tooth-shaped structure at a corresponding position in contact with the braking face of the tape core assembly; or the braking face of the tape core assembly is provided with a tooth-shaped structure at a corresponding position in contact with the braking assembly. In this way, the friction force between the braking assembly and the braking face of the tape core assembly is increased. Of course, an optical shaft structure can also realize the braking of the tape core assembly.

When a circular shaft is adopted, the tooth-shaped structure of the braking face of the tape core assembly adopts an arc-shaped groove that is matched with the circular shaft.

Further, the braking face of the tape core assembly is formed as the outer circumferential surface of the tape core assembly, or the braking face of the tape core assembly is formed as an outwardly protruded side circumferential surface of the side of the tape core assembly.

Further, the tape measure comprises a tape measure lower branch installed on the tape outlet for supporting the lower surface of the tape belt assembly, so that the tape belt assembly can be drawn more smoothly.

Compared with the prior art, the present invention has the following beneficial effects:

(1) The tape measure of the present invention adopts the braking assembly coming into contact with the outer circumference of the tape core assembly and pressing the same to realize the braking of the tape measure, which effectively prevents the scale on the surface of the tape belt from becoming unclear due to friction, and effectively prolongs the service life of the product.

(2) The tape measure of the present invention adopts a circular shaft to change the frictional force between the braking assembly and the tape core assembly to rolling friction, which effectively reduces the friction loss between the two.

(3) The tape measure of the present invention is provided with a guide groove, so that the sliding of the braking assembly is more stable.

(4) The guide groove of the tape measure of the present invention is inclined to the side of the braking assembly, so that a V-shaped included angle is formed between the guide groove and the tape core assembly. When the braking assembly is in the braking position, the more the braking assembly and the tape core assembly are pressed against each other, the greater the pressing force between the two is, so that the rotation of the tape core assembly can be quickly stopped.

(5) The braking assembly of the tape measure of the present invention and its matching parts are compactly arranged, and the space required for the braking assembly to realize the conversion between braking and non-braking is small, so the tape measure of the present invention can be made with a smaller size volume.

Reference signs: 1 tape measure housing; 101 second elastic member fixing member; 102 driving assembly slot; 1021 sliding rail bump; 1022 support block; 2 tape core assembly; 201 braking face; 3 tape belt assembly; 4 braking assembly; 5 driving assembly; 501 first driving member; 502 second driving member; 503 operating member; 504 first elastic member fixing member; 505 connecting member; 5051 clamping block; 5052 support arm; 5052a bayonet; 506 reverse braking lever; 507 connecting member; 6 elastic member; 601 first fixing ring; 602 second fixing ring; 7 guide groove; 8 V-shaped included angle; and 9 tape measure lower branch.

DETAILED DESCRIPTION OF THE PREFERRED EMBODIMENTS

Specific implementations of the present invention will be described in further detail below with reference to the accompanying drawings and embodiments. The following embodiments are intended to illustrate the present invention, but not to limit the scope of the present invention.

Embodiment 1

Figure 1:
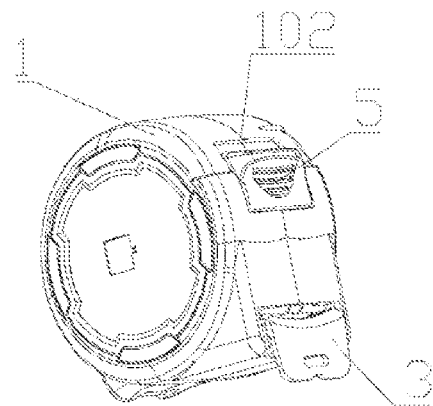
FIG. 1 is a schematic diagram of a three-dimensional structure of a tape measure according to the present invention.
Figure 2:
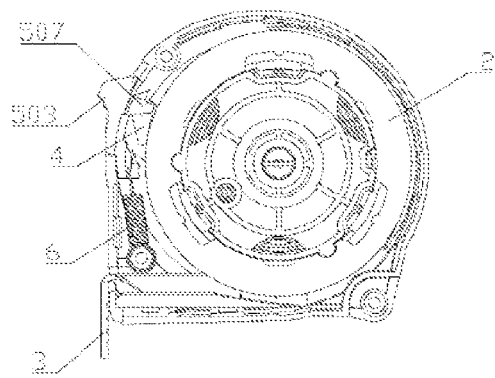
FIG. 2 is a schematic diagram of an internal structure of a tape measure according to Embodiment 1 of the present invention.
Figure 3:
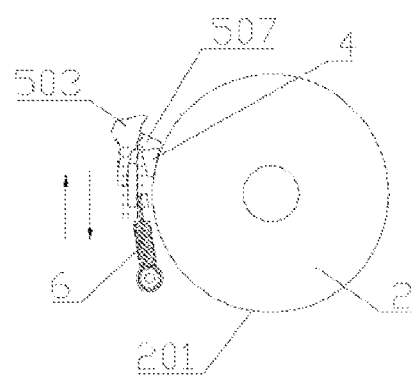
FIG. 3 is a simplified schematic diagram of the internal structure of the tape measure according to Embodiment 1 of the present invention.
Figure 4:
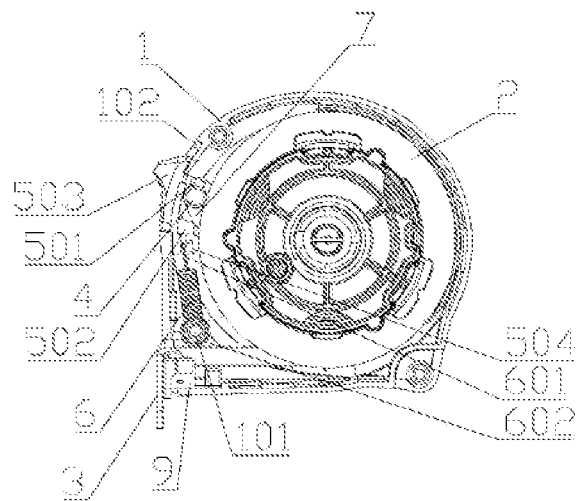
FIG. 4 is a schematic diagram of an internal structure of a tape measure according to Embodiment 2 of the present invention.
Figure 5:
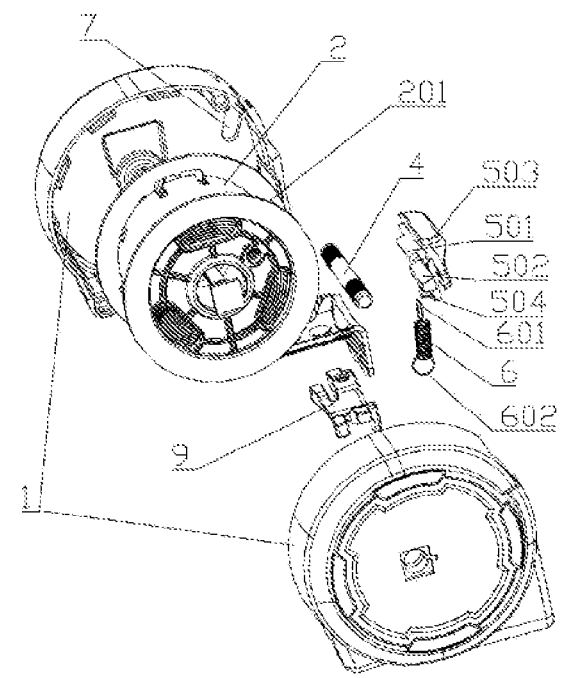
FIG. 5 is a schematic diagram of an exploded structure of the tape measure according to Embodiment 2 of the present invention.

As shown in FIGS. 1-3, a tape measure comprises a tape measure housing 1 provided with an accommodating cavity, a tape core assembly 2 arranged in the accommodating cavity, and a tape belt assembly 3 wound around the tape core assembly 2. The tape measure housing 1 is further provided with a tape outlet for the tape belt assembly 3 to extend outwards. The tape measure comprises a braking assembly 4 and a driving assembly 5. The driving assembly 5 is movably mounted on the tape measure housing 1, the tape core assembly 2 is provided with a braking face 201, and in a state in which the driving assembly 5 moves to a braking position, the driving assembly 5 drives the braking assembly 4 to come into contact with the braking face 201 of the tape core assembly 2 and to press the same, thereby realizing braking.

In the tape measure, the assembly may include a single part or a plurality of parts.

The braking assembly 4 is operated so that when the braking assembly 4 is located at the braking position, the braking assembly 4 comes into contact with the braking face 201 of the tape core assembly 2 and presses the same, and the tape core assembly 2 is restricted to stop rotating; otherwise, the braking assembly 4 is far away from the braking position, the braking assembly 4 and the braking face 201 of the tape core assembly 2 are not pressed against each other, and the tape core assembly 2 can be freely rotated.

Preferably, the tape measure comprises an elastic member 6 acting on the driving assembly 5, wherein an action force of the elastic member 6 causes the driving assembly 5 to have a tendency to move to the braking position.

As shown in FIG. 2, one end of the elastic member 6 is connected and fixed to the driving assembly 5, and the other end is connected and fixed to the tape measure housing 1. Specifically, the driving assembly 5 is provided with a first elastic member fixing member 504, the first elastic member fixing member 504 is a fixing hook, and a connecting end of the elastic member 6 and the driving assembly 5 is provided with a first fixing ring 601 that is matched with the first elastic member fixing member 504 and sleeved on the first elastic member fixing member 504. The tape measure housing 1 is provided with a second elastic member fixing member 101, the second elastic member fixing member 101 is a fixing column, and a connecting end of the elastic member 6 and the tape measure housing 1 is provided with a second fixing ring 602 that is matched with the second elastic member fixing member 101 and sleeved on the second elastic member fixing member 101.

Figure 6:
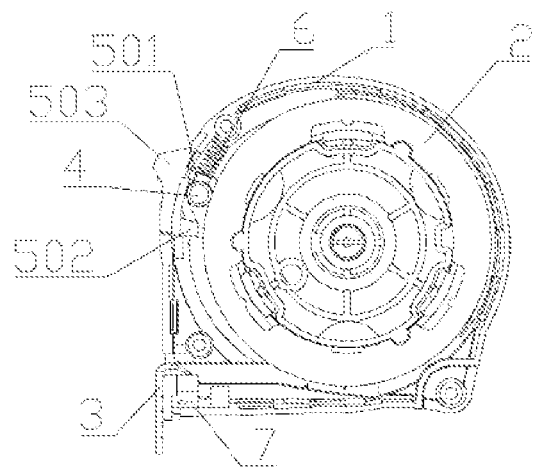
FIG. 6 is a structural schematic diagram of the tape measure according to the present invention, in which an elastic member is a compression spring.

When the driving assembly 5 is far away from the braking position, the elastic member 6 is in a stretched state or a compressed state. As shown in FIG. 2, when the elastic member 6 is in the stretched state, the elastic member 6 wants to return to its original state, so the elastic force generated by the elastic member pulls the driving assembly 5 to move to the braking position. Referring to FIG. 6, when the elastic member 6 is in the compressed state, the elastic member 6 wants to return to its original state, so the elastic force generated by the elastic member pushes the driving assembly 5 to move to the braking position.

The elastic member 6 adopts a spring.

Preferably, the driving assembly 5 is slidably mounted on the tape measure housing 1, and along a direction from the braking position to away from the braking position, a distance between an inner wall of the tape measure housing 1 where the drive assembly 5 is arranged and the braking face 201 of the tape core assembly 2 is set to change from small to large.

Preferably, the braking assembly 4 is connected to the driving assembly 5.

With the above structure, the braking assembly 4 moves synchronously with the driving assembly 5. When the driving assembly 5 is located at the braking position, the braking assembly 4 comes into contact with the braking face 201 of the tape core assembly 2 and presses the same, and the tape core assembly 2 is restricted to stop rotating. When the braking assembly 4 is far from the braking position, since the distance between the tape measure housing 1 and the tape core assembly 2 changes from small to large, the braking assembly 4 as a whole moves from a small distance to a large distance, and the braking assembly 4 is separated from the braking face 201 of the tape core assembly 2 to realize the free rotation of the tape core assembly 2.

Preferably, the braking assembly 4 is a wedge-shaped member, the driving assembly 5 passes out of the tape measure housing 1 to form an operating member 503, and the braking assembly 4 is connected to the operating member 503 through a connecting member 507. In another embodiment, the driving assembly 5 is integrally molded with the braking assembly 4.

The operating member 503 is used by an operator to operate the driving assembly 5.

Preferably, the braking face 201 of the tape core assembly 2 is formed as the outer circumferential surface of the tape core assembly 2, or the braking face 201 of the tape core assembly 2 is formed as an outwardly protruded side circumferential surface of the side of the tape core assembly 2.

Preferably, the tape measure comprises a tape measure lower branch 9 installed on the tape outlet for supporting the lower surface of the tape belt assembly 3, so that the tape belt assembly 3 can be drawn more smoothly.

Embodiment 2

As shown in FIGS. 1 and 4-20, a tape measure comprises a tape measure housing 1 provided with an accommodating cavity, a tape core assembly 2 arranged in the accommodating cavity, and a tape belt assembly 3 wound around the tape core assembly 2. The tape measure housing 1 is further provided with a tape outlet for the tape belt assembly 3 to extend outwards. The tape measure comprises a braking assembly 4 and a driving assembly 5. The driving assembly 5 is movably mounted on the tape measure housing 1, the tape core assembly 2 is provided with a braking face 201, and in a state in which the driving assembly 5 moves to a braking position, the driving assembly 5 drives the braking assembly 4 to come into contact with the braking face 201 of the tape core assembly 2 and to press the same, thereby realizing braking.

In the tape measure, the assembly may include a single part or a plurality of parts.

The braking assembly 4 is operated so that when the braking assembly 4 is located at the braking position, the braking assembly 4 comes into contact with the braking face 201 of the tape core assembly 2 and presses the same, and the tape core assembly 2 is restricted to stop rotating; otherwise, the braking assembly 4 is far away from the braking position, the braking assembly 4 and the braking face 201 of the tape core assembly 2 are not pressed against each other, and the tape core assembly 2 can be freely rotated.

Preferably, the tape measure comprises an elastic member 6 acting on the driving assembly 5, wherein an action force of the elastic member 6 causes the driving assembly 5 to have a tendency to move to the braking position.

When the driving assembly 5 is far away from the braking position, the elastic member 6 is in a stretched state or a compressed state, and generates an elastic force acting on the driving assembly 5, so that the driving assembly 5 has a tendency to move to the braking position. The elastic member 6 adopts a spring.

Preferably, the driving assembly 5 comprises a first driving member 501 acting on the braking assembly 4, the first driving member 501 is arranged on one side of the braking assembly 4, and in a state in which the driving assembly 5 moves to the braking position, the first driving member 501 drives the braking assembly 4 to come into contact with the outer circumferential braking face 201 of the tape core assembly 2 and to press the same.

The driving assembly 5 is slidably mounted on the tape measure housing 1.

When the driving assembly 5 moves to the braking position, the first driving member 501 drives the braking assembly 4 to come into contact with the braking face 201 of the tape core assembly 2, the first driving member 501 presses down the braking assembly 4 and transmits force to the braking assembly 4, so that the braking assembly 4 and the braking face 201 of the tape core assembly 2 are pressed against each other, and the tape core assembly 2 is restricted to stop rotating. When the driving assembly 5 is far away from the braking position, the first driving member 501 does not press down the braking assembly 4, and the braking assembly 4 and the tape core assembly 2 are not pressed against each other to realize the free rotation of the tape core assembly 2.

Preferably, the driving assembly 5 comprises a second driving member 502 acting on the braking assembly 4, wherein the second driving member 502 is arranged on a side opposite to the first driving member 501.

Since the second driving member 502 is arranged on the side opposite to the first driving member 501, namely, the other side of the braking assembly 4, when the driving assembly 5 is far away from the braking position, the second driving member 502 drives the braking assembly 4 away from the braking face 201 of the tape core assembly 2, so that the braking assembly 4 is separated from the braking face 201 of the tape core assembly 2. When the tape core assembly 2 rotates freely, the contact between the tape core assembly 2 and the braking assembly 4 is reduced, which reduces the loss and prolongs the service life.

Specifically, the driving assembly 5 protrudes toward the side of the braking face 201 of the tape core assembly 2 to form the first driving member 501 and the second driving member 502, and a movable space for accommodating the braking assembly 4 is formed between the first driving member 501 and the second driving member 502.

Figure 21:
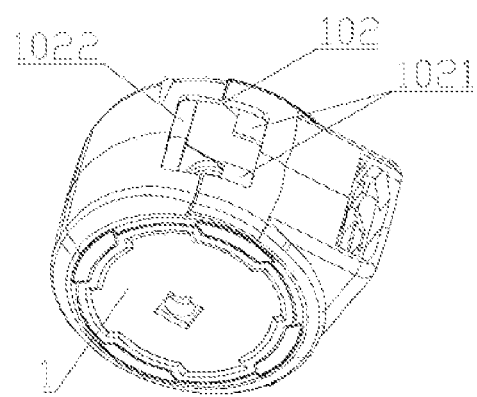
FIG. 21 is a structural schematic diagram of a tape measure housing according to the present invention when a driving assembly is slidably installed.
Figure 22:
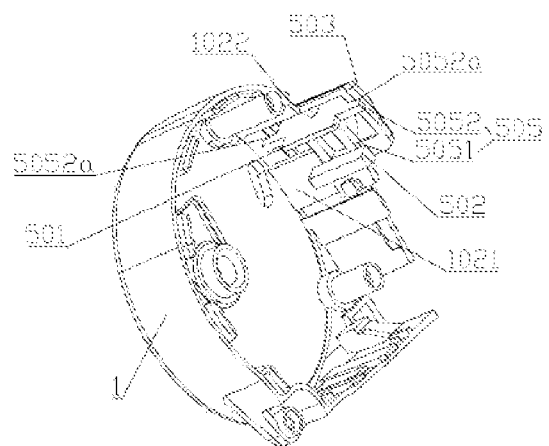
FIG. 22 is a schematic diagram of a matching structure of a tape measure housing and a driving assembly according to the present invention when the driving assembly is slidably installed.

As shown in FIGS. 21 and 22, preferably, the tape measure housing 1 is provided with a driving assembly slot 102, and the driving assembly 5 is slidably arranged in the driving assembly slot 102. The driving assembly slot 102 is provided with sliding rail bumps 1021 on both sides of the braking position, and is provided with support blocks 1022 on the side away from the braking position. The driving assembly 5 comprises an operating member 503 formed from the driving assembly slot 102 and extending out of the tape measure housing, a driving portion located in the tape measure housing, and a connecting portion 505 for connecting the driving portion and the operating member 503. The connecting portion 505 comprises a clamping block 5051 and a support arm 5052. The clamping block 5051 is recessed inwards relative to the operating member 503 and the driving portion, and the connecting portion 505 extends to both sides of the tape measure housing and is in contact with the edge of the driving assembly slot 102 to form the support arm 5052. The support arm 5052 is provided with a bayonet 5052*a* matched with the edge of the driving assembly slot 102 at the contact between the support arm 5052 and the edge of the driving assembly slot 102.

Specifically, the driving portion comprises a first driving member 501 and a second driving member 502. The first driving member 501 and the second driving member 502 are protruded from the connecting portion 505. A movable space for accommodating the braking assembly 4 is formed between the first driving member 501 and the second driving member 502. The support arm 5052 is formed on the side of the first driving member 501.

During assembly, the clamping block 5051 of the connecting portion 505 is clamped between the sliding rail bumps 1021 on both sides of the driving assembly slot 102. Since the clamping block 5051 is recessed inwards relative to the operating member 503 and the driving portion, a sliding rail groove matched with the sliding rail bumps 1021 is formed, so that the driving assembly 5 is slidably clamped in the driving assembly slot 102.

The support block 1022 provided in the driving assembly slot 102 is used to support the operating member 503 away from the braking position side when the driving assembly 5 is slid.

The support arm 5052 is in contact with the edge of the driving assembly slot 102, so that the driving assembly 5 is slid more stably and smoothly.

Preferably, the tape measure comprises a guide groove 7 matched with the braking assembly 4. A side end of the braking assembly 4 is slidably clamped in the guide groove 7.

Specifically, both side ends of the braking assembly 4 are clamped in the guide groove 7.

The guide groove 7 is used for guiding the braking assembly 4 to be close to or away from the braking face 201 of the tape core assembly 2.

The guide groove 7 is arranged to provide a moving trajectory for the braking assembly 4, so that the braking assembly 4 can be more smooth and stable when moving.

Since both ends of the braking assembly 4 are clamped in the guide groove 7, if an installation portion of the braking assembly 4 being clamped into the guide groove 7 is in a rotatable shape, during braking, when the braking assembly 4 comes into contact with the braking face 201 of the tape core assembly 2, the tape core assembly 2 will drive the braking assembly 4 to rotate, and the braking assembly 4 and the braking face 201 of the tape core assembly 2 are pressed against each other in a rolling manner. The use of rolling friction pressing effectively reduces the friction loss between the two and increases the service life of the product.

Preferably, one end of the guide groove 7 intersects with the braking face 201 or its extension surface, and the other end extends away from the braking face 201 toward the side of the tape measure housing 1; and along a direction of the guide groove 7 away from the braking face 201, the guide groove 7 is inclined toward the side of the driving assembly 5.

Since one end of the guide groove 7 intersects the braking face 201 or its extension surface, when the braking assembly 4 moves to an intersecting end of the guide groove 7, it comes into contact with the braking face 201 and presses the same. The other end of the guide groove 7 extends toward the side of the tape measure housing 1 away from the braking face 201, and the braking assembly 4 is separated from the braking face 201 when it is in a distal section.

Figure 7:
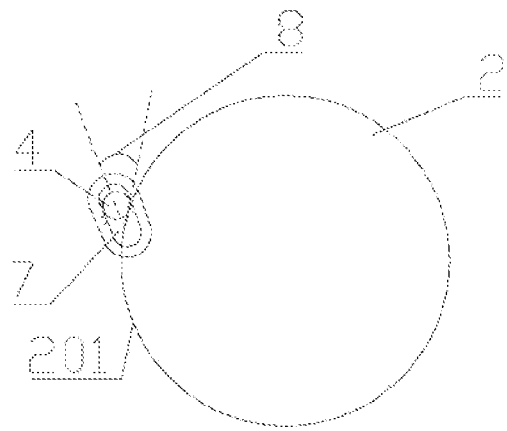
FIG. 7 is a simplified schematic diagram of the internal structure of the tape measure according to Embodiment 2 of the present invention.
Figure 8:
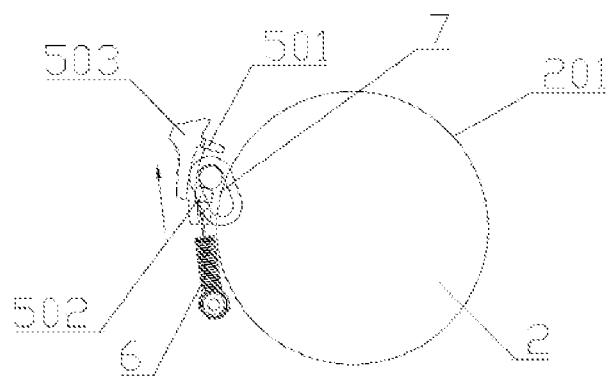
FIG. 8 is a structural schematic diagram of the tape measure according to Embodiment 2 of the present invention, in which a braking assembly is separated from a braking face.
Figure 9:
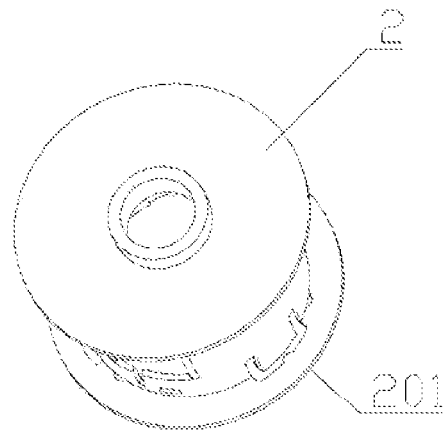
FIG. 9 is a structural schematic diagram of a tape core assembly according to the present invention, in which a braking face is an outer circumference.
Figure 10:
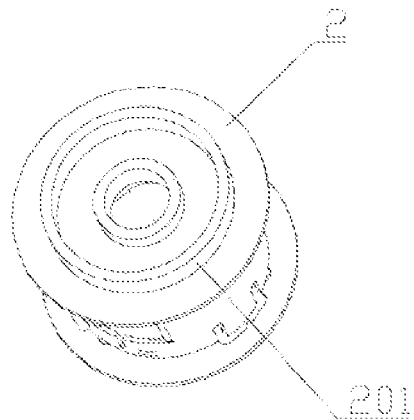
FIG. 10 is a structural schematic diagram of a tape core assembly according to the present invention, in which a braking face is a side circumference.
Figure 11:
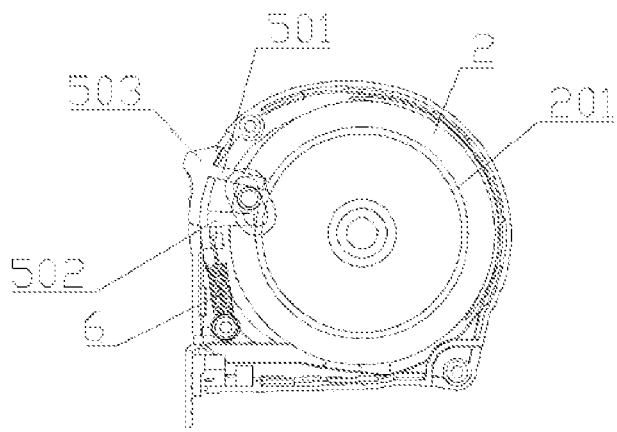
FIG. 11 is a structural schematic diagram of the tape measure according to Embodiment 2 of the present invention, in which a braking face is a side circumference.
Figure 12:
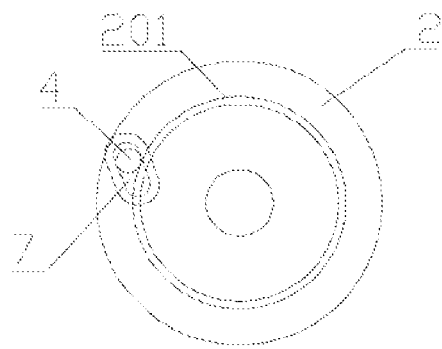
FIG. 12 is a simplified structural schematic diagram of the tape measure according to Embodiment 2 of the present invention, in which the braking face is the side circumference.

As shown in FIG. 7, since the guide groove 7 is inclined to the side of the braking assembly 4, a V-shaped included angle 8 is formed between the guide groove 7 and the braking face 201 of the tape core assembly 2. A connecting line between two ends of the guide groove 7 is referred to as a groove axis. An included angle between the tangent of the intersection of the groove axis and the tape core assembly 2 and the groove axis is a V-shaped included angle 8. When the driving assembly 5 is in the braking position, the braking assembly 4 moves toward the bottom of the guide groove 7 to come into contact with the braking face 201 of the tape core assembly 2 and press the same. Due to the existence of the V-shaped included angle 8, the more the braking assembly 4 and the tape core assembly 2 are pressed against each other, the greater the pressing force between the two is, so that the rotation of the tape core assembly 2 can be stopped quickly. When the driving assembly 5 is far away from the braking position, the braking assembly 4 moves toward the head of the guide groove 7, so that the braking assembly 4 is separated from the tape core assembly 2, and the tape core assembly 2 rotates freely.

Preferably, the guide groove 7 is provided on an inner side wall of the tape measure housing 1.

Figure 20:
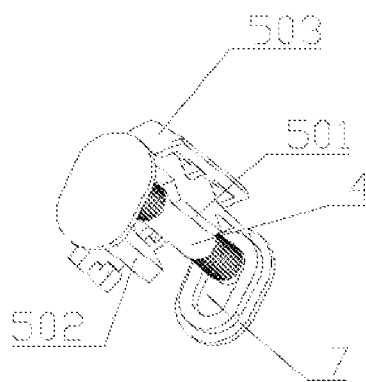
FIG. 20 is a structural schematic diagram of the tape measure according to Embodiment 2 of the present invention, in which a guide groove is arranged on a driving assembly.

As shown in FIG. 20, preferably, the driving assembly 5 is provided with a guide member, and the guide member is provided with the guide groove 7.

Preferably, the braking assembly 4 is a circular shaft or a special-shaped shaft.

Figure 13:
FIG. 13 is a structural schematic diagram of a braking assembly according to Embodiment 2 of the present invention being a circular shaft.
Figure 13:
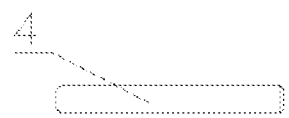

By adopting the circular shaft, the friction between it and the tape core assembly 2 can be realized as rolling friction, which effectively reduces the friction loss between the two and increases the service life of the product. As shown in FIG. 13, and in FIG. 13, the circular shaft at the top of the figure is a circular shaft provided with a tooth-shaped structure, and the circular shaft at the bottom of the figure is an optical shaft.

Figure 14:
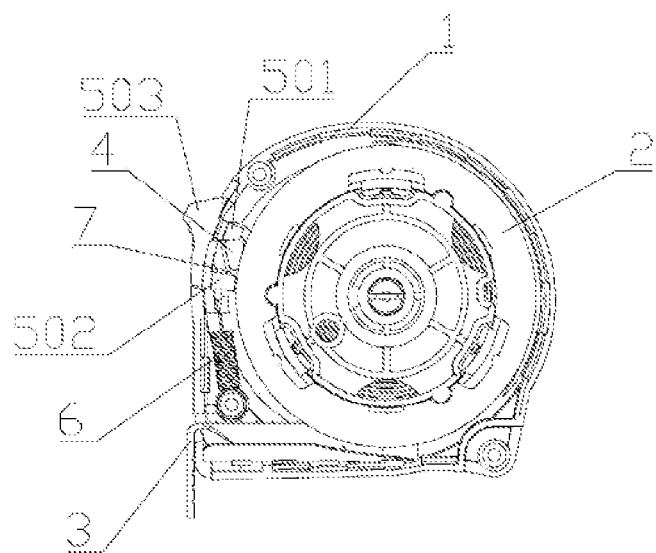
FIG. 14 is a structural schematic diagram of the tape measure according to Embodiment 2 of the present invention, in which the braking assembly is a special-shaped shaft.
Figure 15:
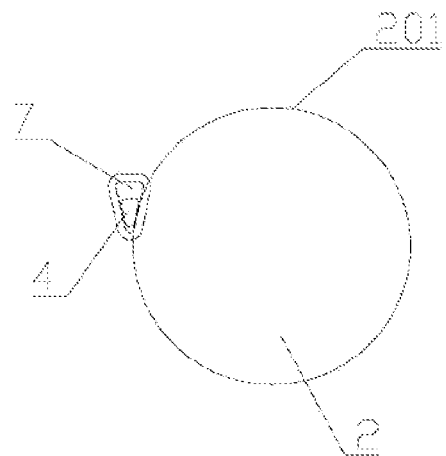
FIG. 15 is a simplified structural schematic diagram of the tape measure according to Embodiment 2 of the present invention, in which the braking assembly is the special-shaped shaft.

As shown in FIGS. 14 and 15, when the special-shaped shaft is adopted, the braking assembly 4 adopts a wedge-shaped shaft design. When the wedge-shaped shaft is adopted, only one end of the guide groove 7 needs to intersect the braking face 201 or its extension surface, and the other end extends toward the side of the tape measure housing 1 away from the braking face 201.

Figure 16:
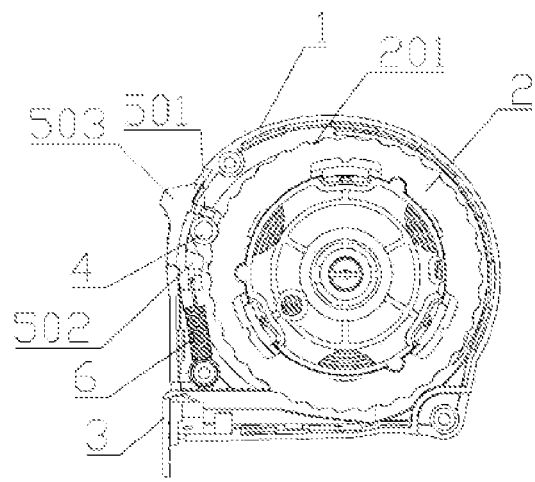
FIG. 16 is a structural schematic diagram of the tape measure according to Embodiment 2 of the present invention, in which the braking face (outer circumferential surface) is a tooth-shaped structure and is an arc-shaped groove.
Figure 17:
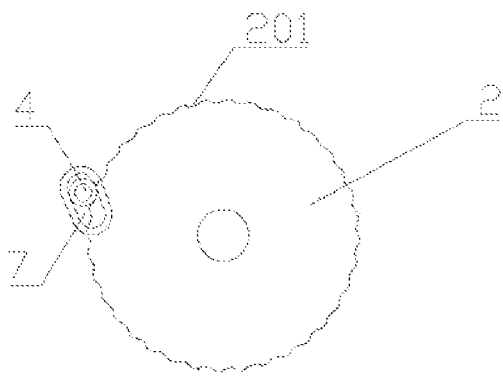
FIG. 17 is a simplified structural schematic diagram of the tape measure according to Embodiment 2 of the present invention, in which the braking face (outer circumferential surface) is the tooth-shaped structure and is the arc-shaped groove.
Figure 18:
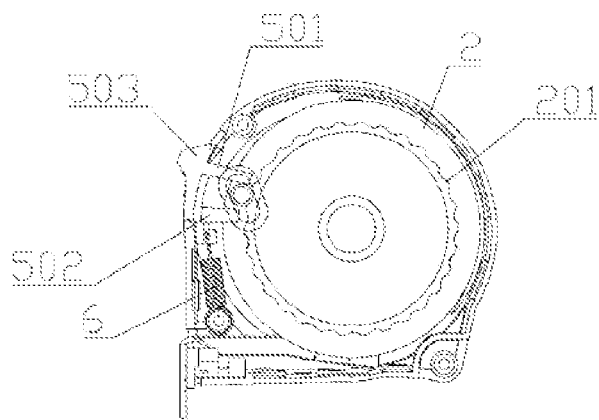
FIG. 18 is a structural schematic diagram of the tape measure according to Embodiment 2 of the present invention, in which the braking face (side circumferential surface) is a tooth-shaped structure and is an arc-shaped groove.
Figure 19:
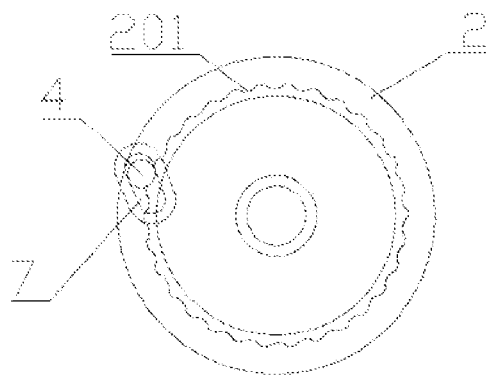
FIG. 19 is a simplified structural schematic diagram of the tape measure according to Embodiment 2 of the present invention, in which the braking face (side circumferential surface) is the tooth-shaped structure and is the arc-shaped groove.

Preferably, as shown in the upper figure in FIG. 13, the braking assembly 4 is provided with a tooth-shaped structure at a corresponding position in contact with the braking face 201 of the tape core assembly 2; or the braking face 201 of the tape core assembly 2 is provided with a tooth-shaped structure at a corresponding position in contact with the braking assembly 4. As shown in FIGS. 16 and 17, in this way, the friction force between the braking assembly 4 and the braking face 201 of the tape core assembly 2 is increased. Of course, an optical shaft structure can also realize the braking of the tape core assembly 2.

As shown in FIGS. 16-19, when a circular shaft is adopted, the tooth-shaped structure of the braking face 201 of the tape core assembly 2 adopts an arc-shaped groove that is matched with the circular shaft.

Preferably, the braking face 201 of the tape core assembly 2 is formed as the outer circumferential surface of the tape core assembly 2, or the braking face 201 of the tape core assembly 2 is formed as an outwardly protruded side circumferential surface of the side of the tape core assembly 2.

The braking face 201 of the tape core assembly 2 adopts a tooth-shaped structure, that is, the outer circumference or side circumferential surface of the tape core assembly 2 adopts a tooth-shaped structure. As shown in FIGS. 16-19, when a circular shaft is adopted, the tooth-shaped structure of the braking face 201 of the tape core assembly 2 adopts an arc-shaped groove that is matched with the circular shaft, that is, the outer circumference or the side circumferential surface of the tape core assembly 2 adopts an arc-shaped groove that is matched with the circular shaft.

Preferably, the tape measure comprises a tape measure lower branch 9 installed on the tape outlet for supporting the lower surface of the tape belt assembly 3, so that the tape belt assembly 3 can be drawn more smoothly.

Embodiment 3

Figure 23:
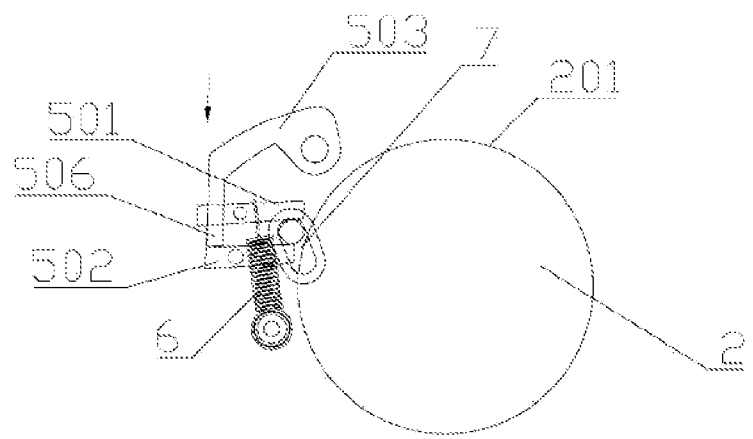
FIG. 23 is a schematic diagram of a structure according to Embodiment 3 of the present invention.

As shown in FIGS. 1 and 23, a tape measure comprises a tape measure housing 1 provided with an accommodating cavity, a tape core assembly 2 arranged in the accommodating cavity, and a tape belt assembly 3 wound around the tape core assembly 2. The tape measure housing 1 is further provided with a tape outlet for the tape belt assembly 3 to extend outwards. The tape measure comprises a braking assembly 4 and a driving assembly 5. The driving assembly 5 is movably mounted on the tape measure housing 1, the tape core assembly 2 is provided with a braking face 201, and in a state in which the driving assembly 5 moves to a braking position, the driving assembly 5 drives the braking assembly 4 to come into contact with the braking face 201 of the tape core assembly 2 and to press the same, thereby realizing braking.

In the tape measure, the assembly may include a single part or a plurality of parts.

Preferably, the tape measure comprises an elastic member 6 acting on the driving assembly 5, wherein an action force of the elastic member 6 causes the driving assembly 5 to have a tendency to move to the braking position. The elastic member 6 adopts a spring.

Preferably, the driving assembly 5 comprises a first driving member 501 acting on the braking assembly 4, the first driving member 501 is arranged on one side of the braking assembly 4, and in a state in which the driving assembly 5 moves to the braking position, the first driving member 501 drives the braking assembly 4 to come into contact with the outer circumferential braking face 201 of the tape core assembly 2 and to press the same.

Preferably, the driving assembly 5 comprises a second driving member 502 acting on the braking assembly 4, wherein the second driving member 502 is arranged on a side opposite to the first driving member 501.

Preferably, the first driving member 501 and the second driving member 502 are rotatably arranged in the tape measure housing 1, one end of the first driving member 501 acts on one side of the braking assembly 4, and one end of the second driving member 502 acts on the other side of the braking assembly 4. A braking force is applied to the first driving member 501, and the braking force acts on the first driving member 501 to press down the braking assembly 4, so that the braking assembly 4 always has a tendency to come into contact with the braking face 201 of the tape core assembly 2 and press the same. When the tape measure is in a reverse braking state, a reverse braking force is applied to the second driving member 502. The reverse braking force acts on the second driving member 502 to make it lift the braking assembly 4, so that the braking assembly is separated from the braking face 201 of the tape core assembly 2.

Specifically, the first driving member 501 and the second driving member 502 adopt a plate-like structure, and the braking force acts between a rotation point of the first driving member 501 and a contact end with the braking assembly 4. The reverse braking force acts on an end of the second driving member 502 away from the braking assembly 4, and a rotation point of the second driving member 502 is between the reverse braking force and the braking assembly 4.

More specifically, one end of the elastic member 6 is fixed between the rotation point of the first driving member 501 and the contact end with the braking assembly 4 for providing braking force. The driving assembly 5 comprises an operating member 503, the operating member 503 is rotatably arranged on the tape measure housing 1, one end of the operating member 503 is provided with a reverse braking lever 506, and the reverse braking lever 506 acts on the side of the second driving member 502 away from the braking assembly 4 to provide a reverse braking force.

The elastic member 6 acts on the first driving member 501. Since the acting point is located between the rotation point and the contact end with the braking assembly 4, the contact end of the first driving member 501 with the braking assembly 4 rotates toward the side close to the braking assembly 4 to press down the braking assembly 4, so that the braking assembly 4 always has a tendency to press the braking face 201.

The rotation point of the operating member 503 and the reverse braking lever 506 are located at two ends of the operating member, respectively. Thus, the operating member 503 is pressed, the operating member 503 rotates to the side where the reverse braking lever 506 is arranged, and the reverse braking lever 506 presses the end of the second driving member 502 away from the braking assembly 4. Since the reverse braking lever 506 and the braking assembly 4 are located on both sides of the rotation point of the second driving member 502, the side acting on the braking assembly 4 lifts the braking assembly 4, so that the braking assembly 4 is separated from the braking face 201 of the tape core assembly 2.

The operating member 503 is released, the braking force drives the first driving member 501 to press down the braking assembly 4, and the braking assembly 4 acts on the second driving member 502 while pressing the braking face 201 of the tape core assembly 2, so that the second driving member 502 is reset.

Preferably, the tape measure comprises a guide groove 7 matched with the braking assembly 4. A side end of the braking assembly 4 is slidably clamped in the guide groove 7.

Specifically, both side ends of the braking assembly 4 are clamped in the guide groove 7.

Preferably, one end of the guide groove 7 intersects with the braking face 201 or its extension surface, and the other end extends away from the braking face 201 toward the side of the tape measure housing 1; and along a direction of the guide groove 7 away from the braking face 201, the guide groove 7 is inclined toward the side of the driving assembly 5. Since the guide groove 7 is inclined toward the side of the braking assembly 4, a V-shaped included angle 8 is formed between the guide groove 7 and the braking surface 201 of the tape core assembly 2.

Preferably, the guide groove 7 is provided on an inner side wall of the tape measure housing 1.

Preferably, the driving assembly 5 is provided with a guide member, and the guide member is provided with the guide groove 7.

Preferably, the braking assembly 4 is a circular shaft or a special-shaped shaft.

Preferably, the braking assembly 4 is provided with a tooth-shaped structure at a corresponding position in contact with the braking face 201 of the tape core assembly 2; or the braking face 201 of the tape core assembly 2 is provided with a tooth-shaped structure at a corresponding position in contact with the braking assembly 4. In this way, the friction force between the braking assembly 4 and the braking face 201 of the tape core assembly 2 is increased. Of course, an optical shaft structure can also realize the braking of the tape core assembly 2.

Preferably, the braking face 201 of the tape core assembly 2 is formed as the outer circumferential surface of the tape core assembly 2, or the braking face 201 of the tape core assembly 2 is formed as an outwardly protruded side circumferential surface of the side of the tape core assembly 2.

Preferably, the tape measure comprises a tape measure lower branch 9 installed on the tape outlet for supporting the lower surface of the tape belt assembly 3, so that the tape belt assembly 3 can be drawn more smoothly.

The above are only preferred embodiments of the present invention. It should be pointed out that for an ordinary person skilled in the art, several improvements and modifications can be made without departing from the technical principles of the present invention. These improvements and modifications should also be considered to be within the scope of protection of the present invention.

The invention claimed is:

1. A tape measure, comprising a tape measure housing (1) provided with an accommodating cavity, a tape core assembly (2) arranged in the accommodating cavity, and a tape belt assembly (3) wound around the tape core assembly (2), the tape measure housing (1) being further provided with a tape outlet for the tape belt assembly (3) to extend outwards, characterized in that: the tape measure comprises a braking assembly (4) and a driving assembly (5), the driving assembly (5) is movably mounted on the tape measure housing (1), the tape core assembly (2) is provided with a braking face (201), and in a state in which the driving assembly (5) moves to a braking position, the driving assembly (5) drives the braking assembly (4) to come into contact with the braking face (201) of the tape core assembly (2) and to press the same, thereby realizing braking;
the driving assembly (5) comprises a first driving member (501) acting on the braking assembly (4), the first driving member (501) is arranged on one side of the braking assembly (4), and in a state in which the driving assembly (5) moves to the braking position, the first driving member (501) drives the braking assembly (4) to come into contact with the braking face (201) of the tape core assembly (2) and to press the same;
the tape measure further comprises a guide groove (7) matched with the braking assembly (4); and
a side end of the braking assembly (4) is slidably clamped in the guide groove (7).

2. The tape measure according to claim 1, characterized in that: the tape measure comprises an elastic member (6) acting on the driving assembly (5), wherein an action force of the elastic member (6) causes the driving assembly (5) to have a tendency to move to the braking position.

3. The tape measure according to claim 1, characterized in that: the driving assembly (5) comprises a second driving member (502) acting on the braking assembly (4), wherein the second driving member (502) is arranged on a side opposite to the first driving member (501).

4. The tape measure according to claim 3, characterized in that: the driving assembly (5) protrudes toward the side of the braking face (201) of the tape core assembly (2) to form the first driving member (501) and the second driving member (502), and a movable space for accommodating the braking assembly (4) is formed between the first driving member (501) and the second driving member (502).

5. The tape measure according to claim 3, characterized in that: the first driving member (501) and the second driving member (502) are rotatably arranged in the tape measure housing (1), one end of the first driving member (501) acts on one side of the braking assembly (4), and one end of the second driving member (502) acts on the other side of the braking assembly (4); a braking force is applied to the first driving member (501), and the braking force acts on the first driving member (501) to press down the braking assembly (4), so that the braking assembly (4) always has a tendency to come into contact with the braking face (201) of the tape core assembly (2) and press the same; the tape measure is in a reverse braking state, and a reverse braking force is applied to the second driving member (502); and the reverse braking force acts on the second driving member (502) to make it lift the braking assembly (4), so that the braking assembly is separated from the braking face (201) of the tape core assembly (2).

6. The tape measure according to claim 1, characterized in that: one end of the guide groove (7) intersects with the braking face (201) or its extension surface, and the other end extends away from the braking face (201) toward the side of the tape measure housing (1).

7. The tape measure according to claim 6, characterized in that: along a direction of the guide groove (7) away from the braking face (201), the guide groove (7) is inclined toward the side of the driving assembly (5).

8. The tape measure according to claim 1, characterized in that: the guide groove (7) is provided on an inner side wall of the tape measure housing (1).

9. The tape measure according to claim 1, characterized in that: the driving assembly (5) is provided with a guide member, and the guide member is provided with the guide groove (7).

10. The tape measure according to claim 1, characterized in that: the braking assembly (4) is a circular shaft or a special-shaped shaft.

11. The tape measure according to claim 1, characterized in that: the braking assembly (4) is provided with a tooth-shaped structure at a corresponding position in contact with the braking face of the tape core assembly (2); or the braking face (201) of the tape core assembly (2) is provided with a tooth-shaped structure at a corresponding position in contact with the braking assembly (4).

12. The tape measure according to claim 1, characterized in that: the braking face (201) of the tape core assembly (2) is formed as the outer circumferential surface of the tape core assembly (2), or the braking face (201) of the tape core assembly (2) is formed as an outwardly protruded side circumferential surface of the side of the tape core assembly (2).

13. The tape measure according to claim 1, characterized in that: the tape measure housing (1) is provided with a driving assembly slot (102), the driving assembly (5) is slidably arranged in the driving assembly slot (102), and the driving assembly slot (102) is provided with sliding rail bumps (1021) on both sides of the braking position, and is provided with support blocks (1022) on the side away from the braking position; the driving assembly (5) comprises an operating member (503) formed from the driving assembly slot (102) and extending out of the tape measure housing, a driving portion located in the tape measure housing, and a connecting portion (505) for connecting the driving portion and the operating member (503); and the connecting portion (505) comprises a clamping block (5051) and a support arm (5052), the clamping block (5051) is recessed inwards relative to the operating member (503) and the driving portion, the connecting portion (505) extends to both sides of the tape measure housing and is in contact with the edge of the driving assembly slot (102) to form the support arm (5052), and the support arm (5052) is provided with a bayonet (5052*a*) matched with the edge of the driving assembly slot (102) at the contact between the support arm (5052) and the edge of the driving assembly slot (102).

14. The tape measure according to claim 1, characterized in that: an installation portion of the braking assembly (4) being clamped into the guide groove (7) is in a rotatable shape, and the braking assembly (4) and the braking face (201) of the tape core assembly (2) are pressed against each other in a rolling manner.

\* \* \* \* \*